United States Patent [19]

Grooms et al.

[11] Patent Number: 5,173,615
[45] Date of Patent: Dec. 22, 1992

[54] VEHICLE ANTI-THEFT SEALED IGNITION SWITCH AND WIRES

[76] Inventors: Emery W. Grooms, 14010 SW. 205 Ave.; James LePetrie, 12600 SW. 207 Ave., both of Miami, Fla. 33196

[21] Appl. No.: 633,079

[22] Filed: Dec. 24, 1990

[51] Int. Cl.⁵ .............................................. B60R 25/00
[52] U.S. Cl. .................................. 307/10.2; 180/287
[58] Field of Search ............................. 307/10.2–10.6; 361/142, 172, 171, 424, 428; 174/36, 102 R; 180/287; 123/198 B; 200/61.54; 70/237–239, 252, 448, 451; 340/426

[56] References Cited

U.S. PATENT DOCUMENTS

| | | | |
|---|---|---|---|
| 2,820,149 | 1/1958 | Roth | 307/10.2 |
| 3,773,138 | 11/1973 | Killmeyer | 180/287 |
| 3,892,976 | 7/1975 | Tsevdos et al. | 307/10.3 |
| 4,734,896 | 3/1988 | Soma et al. | 340/568 |
| 4,737,762 | 4/1988 | Ohnishi | 340/426 |
| 4,812,670 | 3/1989 | Goulet | 307/10.2 |
| 4,866,416 | 9/1989 | Holzhauer et al. | 340/426 |

Primary Examiner—A. D. Pellinen
Assistant Examiner—David Osborn
Attorney, Agent, or Firm—Henderson & Sturm

[57] ABSTRACT

An automobile anti-theft device capable of preventing access to the automobile's ignition wires from inside the passenger compartment. The prevention is accomplished by sealing the key switch and wire connectors in a metal compartment, protecting the ignition wires between the ignition switch and the engine compartment in an adjustable metal conduit, and clamping the ignition wires inside the engine compartment such that attempting to access the wires will disconnect the wires and make them inaccessible from the passenger compartment.

4 Claims, 2 Drawing Sheets

VEHICLE ANTI-THEFT SEALED IGNITION SWITCH AND WIRES

TECHNICAL FIELD

This invention relates generally to vehicle anti-theft devices and more particularly to a device used to prevent ready access to the vehicles ignition switch and wire connectors by sealing them into a metal compartment.

BACKGROUND ART

Automobile theft is a prevalent problem in today's society. Auto theft usually falls into one of three categories: professional, joy riders and insurance fraud by owners. Common to both professional and joy rider automobile theft is the technique of temporarily short circuiting the ignition wires from within the passenger compartment and simply driving away. The average car thief will drive away within three minutes after he first touches the door handle. In contrast, the average police response time is nine minutes which means the vehicle is several miles away when the police arrive. Alarms are of little value since there are so many false alarms that people pay little attention when one goes off.

The best defense against automobile theft is to make the ignition wires inaccessible from the passenger compartment. When this is done, the thief must access the ignition wires from inside the engine compartment. This process takes a considerably longer period of time and works to protect the automobile in two ways. First, the extra time to access the ignition wires from inside the engine compartment allows more time for the police to arrive, thus increasing the chances of catching the thief before he has a chance to escape. Second, the extra time required and the inconvenience of having to go into the engine compartment will deter and discourage the would-be thief from stealing the automobile.

What is needed is an apparatus which will effectively prevent a would-be thief from accessing the ignition wires from the passenger compartment. This apparatus should be simple, inexpensive and be equally applicable to older cars as well as newer ones.

DISCLOSURE OF THE INVENTION

The present invention relates to an anti-theft device which prohibits access to ignition wires from the passenger compartment. An anti-theft sealed ignition switch in accordance with the present invention comprises an ignition switch sealed in a metal housing, clamped wire connections located in the engine compartment, a steel plate attached to the fire wall of the automobile through which the ignition wires pass into the engine compartment, and a flexible, metal conduit which protects the ignition wires between the switch and the steel plate.

The ignition wires are completely protected inside the passenger compartment. Easy access to the ignition wires is not possible because of the metal protection. Any attempt to gain forcible access to the wires will cause the wires to disconnect from the terminals, thus preventing the possibility of short circuiting the ignition system.

Accordingly, it is an object of the present invention to provide an automobile anti-theft sealed ignition switch capable of rendering ignition wires inaccessible from the passenger compartment of the vehicle.

Another object if the present invention is to provide a device which will increase the time required for a car thief to successfully start the automobile.

A further objective of the present invention is to provide an anti-theft device which is simple, effective and economical and which contains no moving parts which could wear out.

A still further object of the present invention is to provide an anti-theft device which can work equally well in new cars as in older ones.

Other objects, advantages and novel features of the present invention will become apparent from the following detailed description of the invention when considered in conjunction with the accompanying drawings.

BEST MODE FOR CARRYING OUT THE INVENTION

Figure 1:
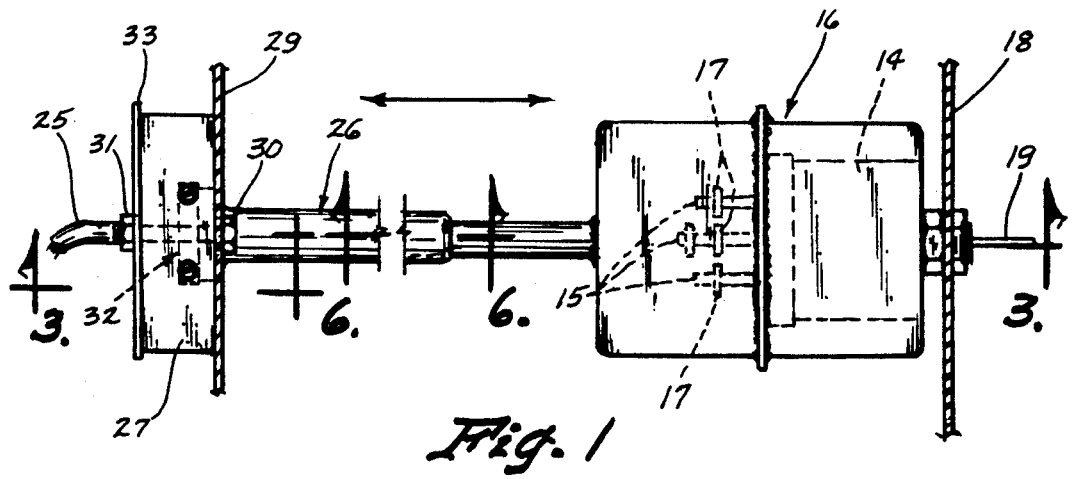
FIG. 1 is an elevational view of a preferred embodiment of a sealed ignition switch built in accordance with the present invention.
Figure 2:
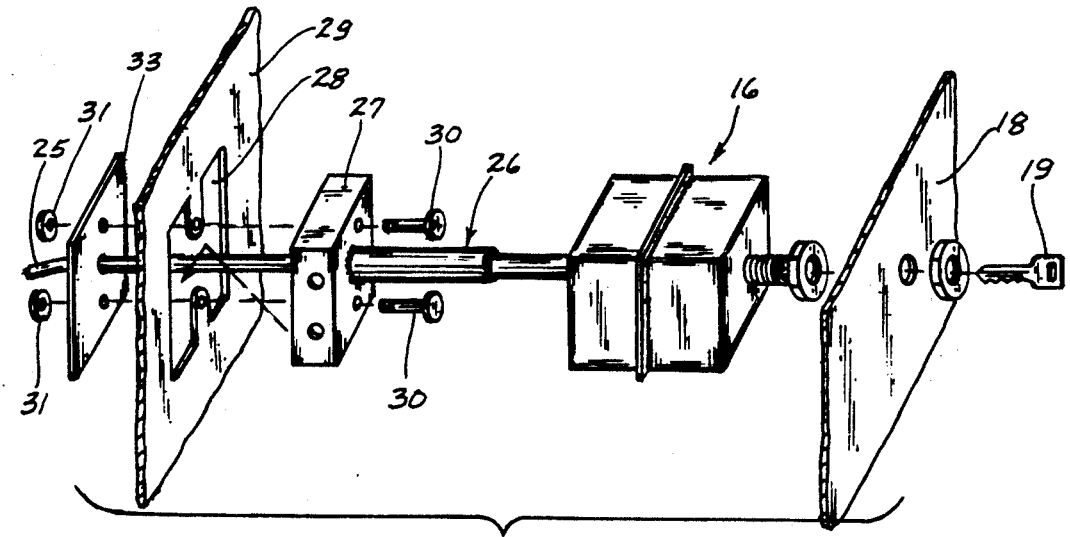
FIG. 2 is an exploded perspective view of the present invention.
Figure 3:
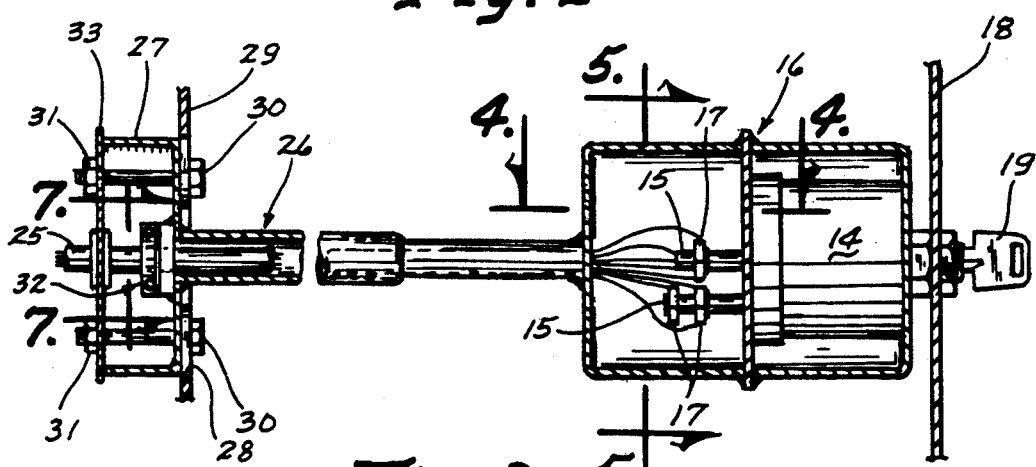
FIG. 3 is a sectional view taken on line 3—3 of FIG. 1 of the present invention.

Referring now to the drawings wherein like reference numerals designate identical or corresponding parts throughout the several views. FIG. 1, 2 and 3 show an automobile anti-theft sealed ignition switch built in accordance with the present invention. A key switch (14) and wire terminals (15) are sealed in a metal housing (16). The metal housing can be mounted either in the dash or in the steering column of the automobile. In the FIGS. 1-3 a metal plate (18) represents the surface to which the switch (14), terminals (15) and housing (16) could be mounted. The housing (16) can be mounted to the surface (18) using mounting nuts (31). Obviously the configuration and mounting of the ignition switch (16) could be accomplished in a variety of ways. The switch (14) operates like a typical automobile switch and can be activated using the automobile's key (19).

The ignition wires (25) are protected inside the passenger compartment in an adjustable metal conduit (26). The conduit (26) is welded to a metal box (27). A central hole in the metal box (27) allows for the passage of the ignition wires (25) through the fire wall (29) and into the engine compartment. The metal box (27) is attached to the fire wall (29) using two free spinning bolts (30) which extends through holes in box (27), holes in plate (33) and through the holes in tabs (34). The free spinning bolts (30) make it impossible to remove the metal plate (27) from within the passenger compartment because a wrench needs to hold bolt (30) in the passenger compartment and another wrench needs to hold nut (31) in the engine compartment. Further protection is provided by using wire clamps (32) in a metal box (27).

The metal housing (27) is inserted into the engine compartment by tipping the unit down in the passenger compartment, so the axis of conduit (26) is substantially parallel to the dashed arrow shown in FIG. 2, sliding box (27) through hole (28) in fire wall (29) and then pushing the box (27) through the hole (28). The ignition wires (25) are securely clamped between parts (32a) and (32b) of clamp (32) by fasteners (32c). Any forceful attempt to pull out the conduit (26) or metal box (27) will cause the ignition wires (25) to fracture at clamp (32). With the ignition wires (25) disconnected inside the engine compartment, it becomes impossible to short circuit the ignition system from inside the passenger compartment.

Figure 4:
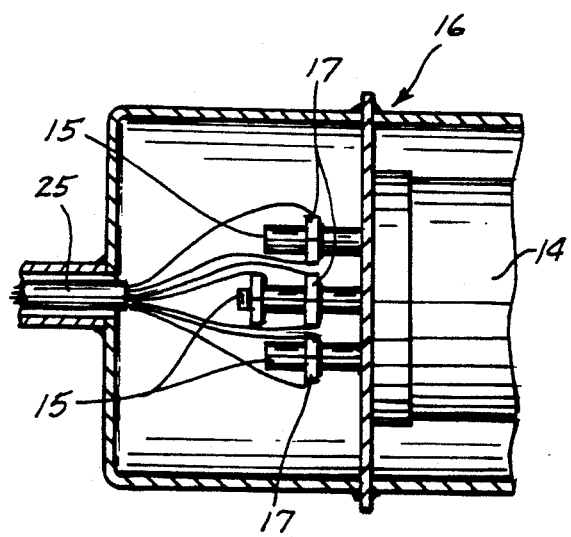
FIG. 4 is a sectional view taken on line 4—4 of FIG. 3 showing the wire connectors of the ignition switch.
Figure 5:
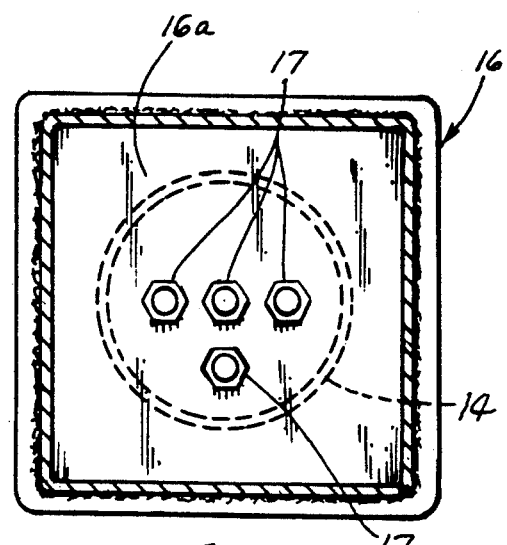
FIG. 5 is a sectional view taken on line 5—5 of FIG. 3 showing the wire connectors of the ignition switch.

Referring now to FIGS. 4-5, the switch (14) has four terminals (15). The four terminals (15) are connections for the four settings of the switch (14): battery, ignition, starter and accessories. Part of the metal housing (16) is a metal plate (16a) through which the four terminals (15) extend. The ignition wires (25) are attached to the terminal (15) using plastic nuts (17). Should a thief successfully pry out the switch (14), the metal plate (16a) would break the plastic nuts (17), thus disconnecting the ignition wires and preventing access.

Figure 6:
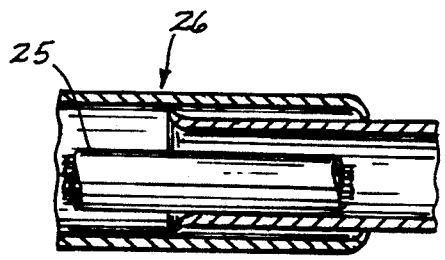
FIG. 6 is a sectional view taken on line 6—6 of FIG. 1 showing the adjustable metal conduit.
Figure 7:
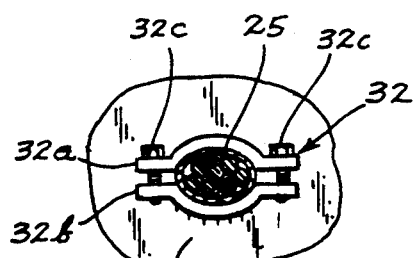
FIG. 7 is a cross sectional view taken along line 7—7 of FIG. 3.

Referring now to FIG. 6, the metal conduit (26) can be adjusted to the necessary length. The two pieces slide in and out to various lengths but the beveled ends prevent the pieces from sliding apart.

Obviously, many modifications and variations of the present invention are possible in light of the above teachings. For example, metal conduit (26) could be of a flexible type, like that used to encase electrical wiring in homes or office buildings. It is therefore to be understood that, within the scope of the appended claims, the invention may be practiced otherwise than as specifically described.

We claim:

1. A vehicle theft deterrent apparatus comprising:

a key activated ignition switch means for selectively electrically activating the starter solenoid of a vehicle from outside of the engine compartment; wherein, the switch means include a plurality of terminals;

wires leading from said switch means to said engine compartment for connection with a starter solenoid, said wires being operably connected to the plurality of terminals on said switch means;

a rigid housing disposed intermediate said switch means and said wires; wherein, said housing surrounds said ignition switch means and includes a plate provided with apertures for receiving said plurality of terminals;

frangible means in the form of plastic nuts forming the operative connection between said wires and said terminals; and, an adjustable length metal conduit surrounding said wires between said engine compartment and said rigid housing; wherein, said adjustable length metal conduit comprises two lengths of metal conduit slideably disposed relative to one another.

2. The apparatus as in claim 1; wherein, said two lengths of metal conduit comprise a first length of metal conduit having one end fixedly secured to said housing and the other end slideably disposed in one end of the second length of conduit.

3. The apparatus as in claim 2 further comprising:

a metal box fixedly secured to the wall of said engine compartment; wherein, the other end of said second length of conduit is fixedly secured to said metal box; and, wherein said wires pass through the two lengths of metal conduit and said metal box, and into said engine compartment.

4. The apparatus as in claim 3; further comprising:

a clamp disposed within said metal box; wherein, said clamp is securely fastened to the periphery of the wires in said metal box; wherein, any attempt to displace the wires within the metal box will cause the clamp to break the wires.

* * * * *